(12) United States Patent
Orzel

(10) Patent No.: US 6,478,249 B1
(45) Date of Patent: Nov. 12, 2002

(54) REEL FLANGE

(76) Inventor: Jean Pierre Orzel, 10, rue du Chaufour F-59165, Auberchicourt (FR)

( * ) Notice: Subject to any disclaimer, the term of this patent is extended or adjusted under 35 U.S.C. 154(b) by 0 days.

(21) Appl. No.: 09/869,603

(22) PCT Filed: Mar. 17, 2000

(86) PCT No.: PCT/FR00/00654
§ 371 (c)(1),
(2), (4) Date: Jul. 2, 2001

(87) PCT Pub. No.: WO00/56653
PCT Pub. Date: Sep. 28, 2000

(30) Foreign Application Priority Data

Mar. 19, 1999 (DE) .......................................... 199 12 366
Dec. 28, 1999 (FR) ............................................. 99 16561

(51) Int. Cl.⁷ ............................................... B65H 75/14
(52) U.S. Cl. ................. 242/608.4; 242/607; 242/608.2; 242/614; 242/118.7
(58) Field of Search ........................... 242/608.4, 118.6, 242/118.32, 118.7, 118.4, 608, 608.2, 608.3, 610, 614, 607

(56) References Cited

U.S. PATENT DOCUMENTS

| | | | | |
|---|---|---|---|---|
| 1,702,242 A | * | 2/1929 | Bureau ........................ | 242/601 |
| 3,704,838 A | * | 12/1972 | Bernier et al. ............. | 242/608.3 |
| 4,895,316 A | * | 1/1990 | Salloum ................... | 242/118.4 |
| 4,901,939 A | * | 2/1990 | Obst et al. ............... | 242/118.4 |
| 5,004,179 A | * | 4/1991 | Salloum ................... | 242/118.6 |
| 5,242,129 A | * | 9/1993 | Bailey et al. ............. | 242/608.2 |
| 5,806,788 A | * | 9/1998 | Witwer et al. ............ | 242/118.6 |
| 5,967,454 A | * | 10/1999 | Yarnell et al. ........... | 242/608.4 |
| 6,164,588 A | * | 12/2000 | Jacobsen .................. | 242/608.4 |

FOREIGN PATENT DOCUMENTS

| | | |
|---|---|---|
| CH | 415 225 | 1/1967 |
| DE | 38 42 162 A | 7/1990 |
| GB | 2 173 171 A | 10/1986 |

* cited by examiner

Primary Examiner—William A. Rivera
(74) Attorney, Agent, or Firm—Miles & Stockbridge P.C.; John C. Kerins

(57) ABSTRACT

A reel flange is provided comprising wooden pieces (2A) disposed in a plane so as to constitute a disk and a connector (100) for maintaining said wooden pieces in the required position. The wooden pieces (2A) each have an overall sector shape which, when placed side by side, form a disk, and the connector includes a band (6) that presses onto the periphery of the disk and two plates centered on the disk that maintain the central area of the disk.

9 Claims, 3 Drawing Sheets

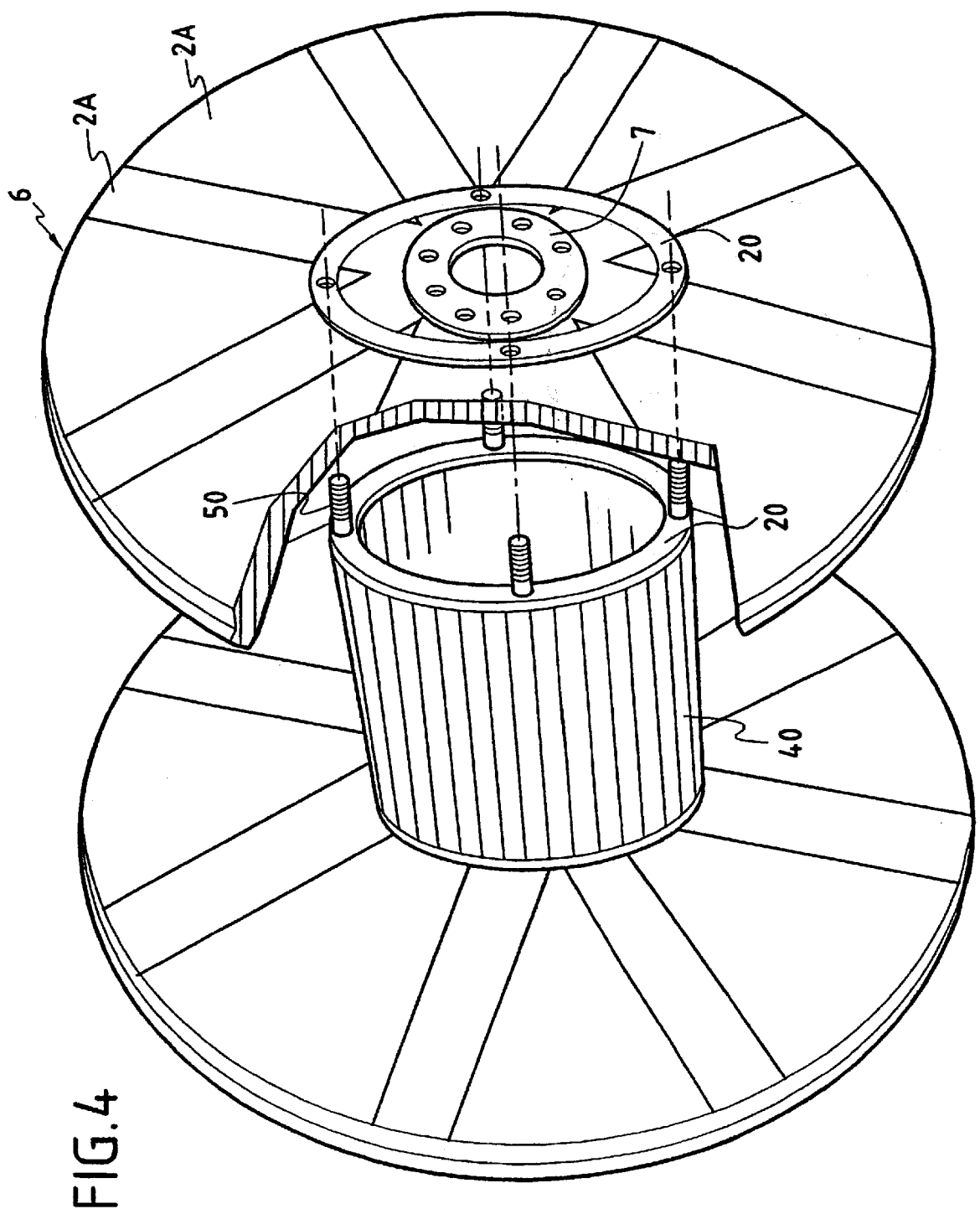

REEL FLANGE

BACKGROUND OF THE INVENTION

1. Field of the Invention

The invention relates to a reel flange.

It also relates to the reel obtained.

2. Description of Related Art

The packaging of wire in long lengths is done in coil form

To do this, the wire is wound, either on a mandrel that is temporary, i.e. used only to produce a coil whose characteristics result simply from the way in which the wire has been wound, or on a support also known as a reel.

Conventionally, a reel is constituted by two parallel flanges held the required distance apart by a central body onto which the filiform material is wound, at least indirectly.

This central body is generally tubular so that a spindle can be inserted into it in order to manipulate these reels.

These reels can be made of plastic, which requires the production of a relatively expensive mold.

But normally, the flanges are made of wood, a material that is relatively inexpensive and easy to work.

To produce these flanges, relatively large planks are used, disposed side by side so as to be held edge to edge by joining pieces that extend at right angles to the longitudinal axes of said planks.

Often, these joining pieces are also constituted by wooden planks forming a second layer of planks running crosswise to the first layer.

To give the assembly a disk shape, the outside edges of the planks are rectified, after assembly at the latest, so as to form a portion of the circle delimiting the disk.

Nails hold everything together.

The mechanical behavior of these layers is terrible.

Sometimes, a steel band is provided to limit wear on the flanges.

These reels nevertheless still require manual production.

One of the objects of the invention is to obtain a reel flange that is easy to construct.

SUMMARY OF THE INVENTION

To this end, the subject of the invention is a reel flange comprising:

wooden pieces disposed in a plane so as to constitute a disk, and so-called connecting means for maintaining said wooden pieces in the required position, this reel being characterized in that:

the wooden pieces each have an overall sector shape which, when placed side by side, form a disk, and the connecting means comprise a band that presses on the periphery of the disk, and two plates centered on the disk that maintain the central area of the disk.

BRIEF DESCRIPTION OF THE DRAWINGS

The invention will be clearly understood with the aid of the description below, given as a non-limiting example in reference to the attached drawing, which schematically represents:

FIG. 4: an exploded view of a variant of embodiment.

DETAILED DESCRIPTION OF THE PREFERRED EMBODIMENTS

Figure 1:
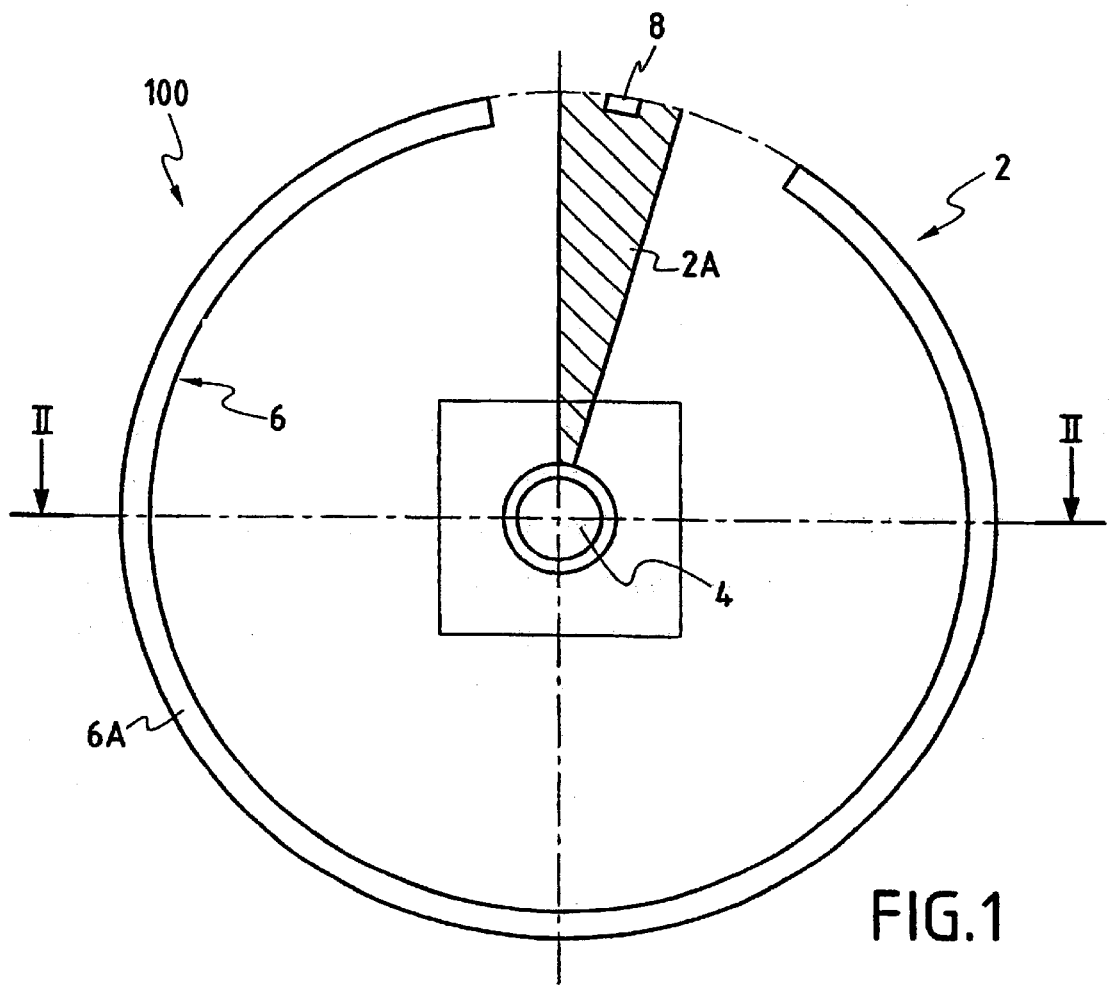
FIG. 1: a front view of a flange of a reel.

Referring to the drawing, we see a reel 1.

Conventionally, a reel 1 is constituted by two parallel flanges 2 held the required distance apart by a central body 3 onto which the filiform material is wound, at least indirectly.

The central body 3 is generally tubular so that a spindle can be inserted into it in order to manipulate these reels.

Figure 2:
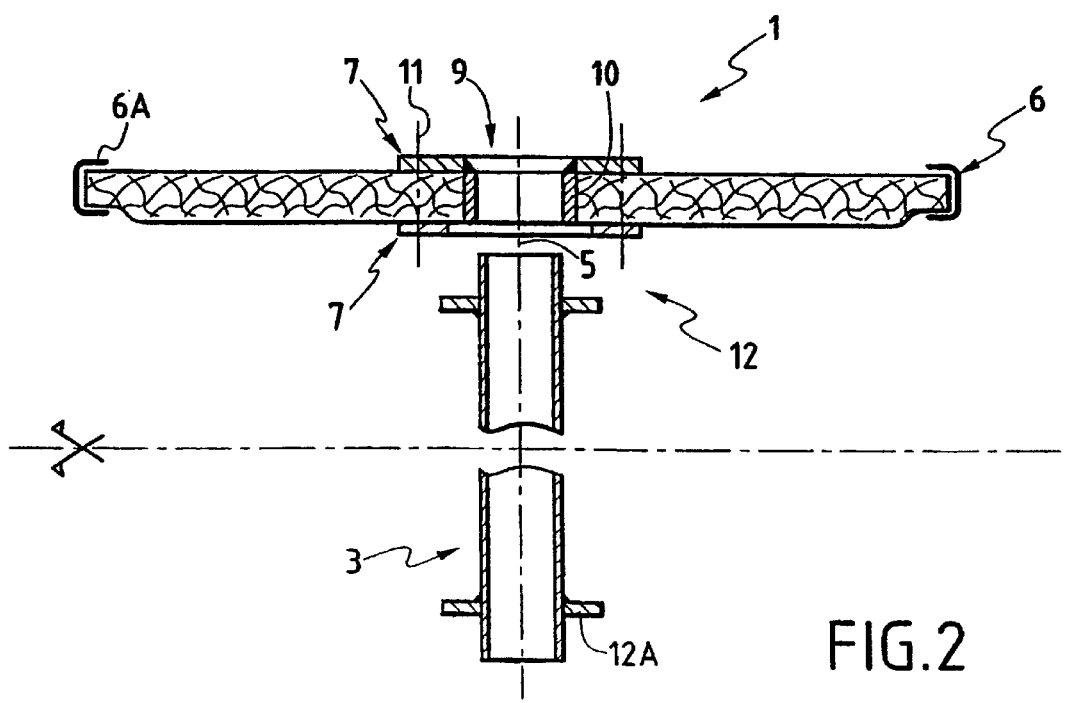
FIG. 2: an axial sectional view of a reel during assembly.

In this case, the central body is a metal tube (FIG. 2) or a wooden body (FIG. 4).

Each of the flanges 2 of the reel 1 comprises wooden pieces 2A disposed in a plane so as to constitute a disk, and so-called connecting means 100 for maintaining said wooden pieces in the required position.

This flange also has a cutout 4 centered on its axis, 5 of rotation to make it possible to grasp it.

According to one characteristic of the invention:

the wooden pieces 2A each have an overall sector shape which, when placed side by side, form a disk, and the connecting means comprise a band 6 that presses on the periphery of the disk, and two plates 7 centered on the disk, which maintain the central area of the disk.

Advantageously, the band 6 has a U-shaped cross section such that the sides 6A of the U laterally clamp the sectors 2A.

This band 6 is made from a formed metal strip or a preformed section so as to have a U-shaped cross section, which is curved so that it takes the form of a hoop.

The two ends of the strip or section are then joined, preferably by welding.

Advantageously, the sector 2A located in the area of the weld of the two ends of the band has a notch 8 perpendicular to this weld so that the wood does not run the risk of catching fire during the welding operation.

Advantageously, the plates 7 have an axial cutout 9 and one of them is welded to the end of a tubular crosspiece 10.

More precisely, it is the external plate that is attached to the crosspiece 10.

The second plate is held to the first one by bolts 11 passing through some of the sectors so as to form a hub.

Figure 3:
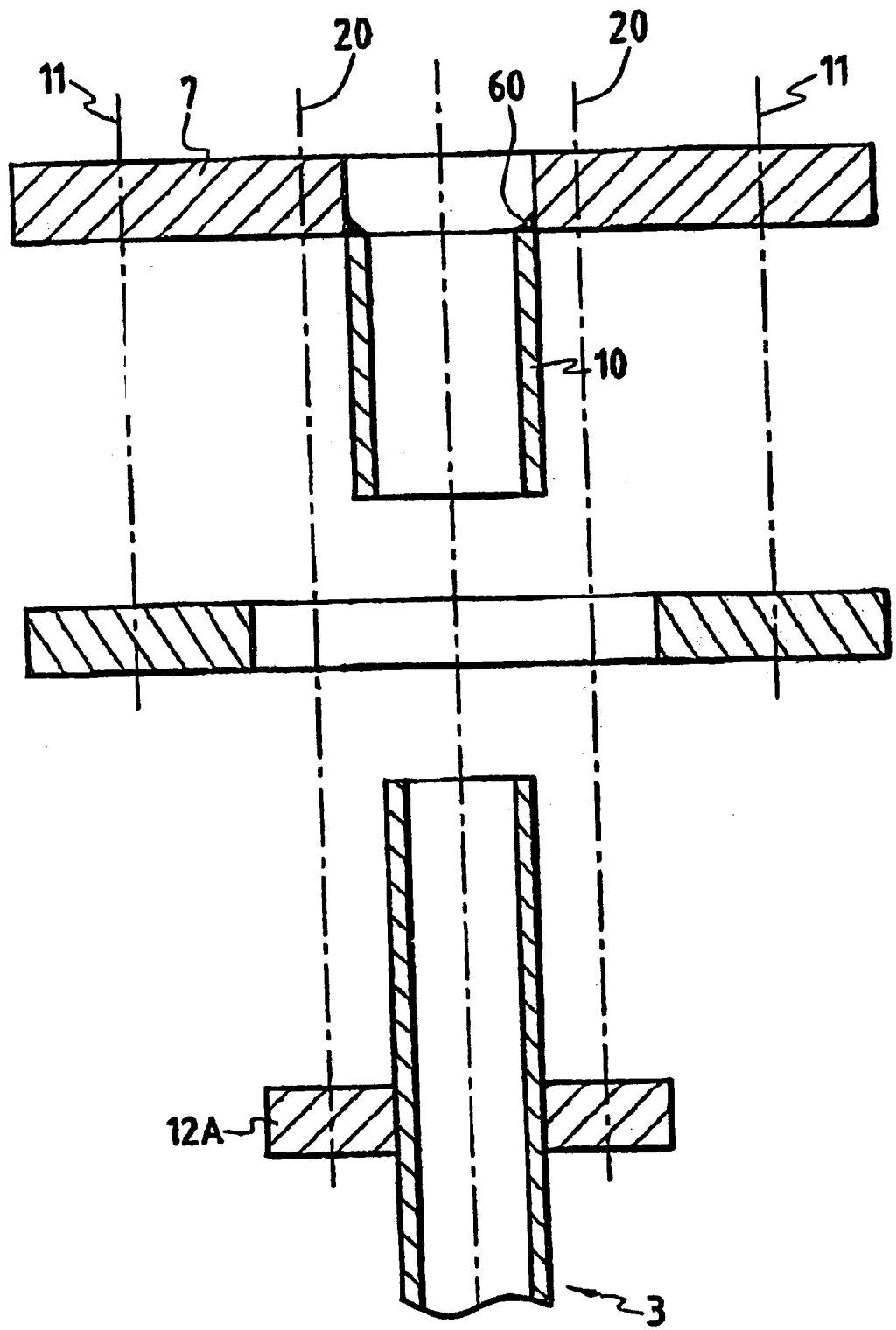
FIG. 3: a detail of FIG. 2 prior to assembly.

The diameter of the axial cutout of the plate 7 located on the outside of the reel is equal to the external diameter of the tubular crosspiece to which it is attached by welding (see FIG. 3).

In the example represented, the aforementioned plate is not placed on the crosspiece but is slightly offset, and it is the welding bead 60 that provides the connection.

The other plate, the one pressing on the so-called internal surface of the flange, has a cutout 9 larger than the external diameter of the crosspiece 10, and this plate is therefore held in place by bolts 11 whose shafts pass through the two plates and the wooden pieces so as to clamp the center part of the flange.

The internal diameter of the tubular crosspiece is approximately equal to the external diameter of the central body when the latter is mounted on a spindle.

The flanges are then attached to the central body by fastening means 12 so as to form a reel.

These fastening means could, of course, be embodied by weld points or a welding bead, but it is more advantageous for these fastening means to be demountable, like bolts 20.

For this reason, the central body has, at a distance from each of its ends, a stop 12A that extends at a right angle to the longitudinal axis of said central body and tie rods (not represented) that bring together the flanges, which thus come to rest on the aforementioned stops.

The stop 12A has an external section identical to the internal section of the cutout 9 of the internal plate so that it can be wedged inside this cutout.

Preferably this cutout 9 is circular and the plate is square.

It is thus easy to exchange a reel flange if it is broken or to replace it with another one of a different diameter.

Sometimes, one of the sectors will be made of a material other than wood, such as metal.

As shown in FIG. 4, another form of reel is represented.

As may be seen, the shape of the sectors can be substantially different so as to form the spokes of a wheel, between which said sectors of different dimensions are housed.

The narrower sectors can, for example, be made of a more rigid wood than the wider sectors.

The body of the reel is also made with wooden planks so as to constitute a cylinder 40.

Plates 20 make it possible to connect and hold this cylindrical part 40 to the reel flanges.

Tie rod rods 50 are used.

What is claimed is:

1. Reel flange comprising a plurality of wooden pieces (2A) disposed in a single plane and forming a single layer so as to constitute a disk, and connecting means (100) for maintaining said wooden pieces in said plane in a fixed position relative to one another, the reel flange being characterized in that:

the wooden pieces (2A) each have an overall sector shape which, when placed side by side, form a disk and the connecting means comprise a band (6) that presses on the periphery of the disk, and two plates (7) centered on the disk and disposed on opposite sides thereof that maintain a central area of the disk, said reel flange further comprising a tubular crosspiece (10) secured to one of said two plates, wherein the other of said two plates has a cutout that is larger than an exterior surface of said crosspiece.

2. Flange according to claim 1, characterized in that the band (6) has a U-shaped cross section such that radially inwardly extending legs (6A) of the band laterally clamp the sectors (2A).

3. Flange according to claim 2, characterized in that the wooden piece sector (2A) located in an area of a weld joining two ends of the band (6) has a notch (8) perpendicular to this weld so that the wood does not run the risk of catching fire during the welding operation.

4. Flange according to claim 1, characterized in that each of said two plates (7) has an axial cutout (9), and said plate which is secured to said tubular crosspiece (10) forms a hub with said crosspiece.

5. Flange according to claim 4, characterized in that the internal diameter of the tubular crosspiece is approximately equal to an external diameter of a central body onto which the flange is laid.

6. Reel comprising a central body and at least one flange according to claim 5 characterized in that said at least one flange is attached by fastening means (12) to the central body so as to form said reel.

7. Reel according to claim 8, characterized in that the central body has, at a distance from each of its ends, a stop (12A) that extends at a right angle to the longitudinal axis of said central body, and tie rods that bring together said at least one flange which thus comes to rest on said stop.

8. Flange according to claim 1, characterized in that the diameter of the axial cutout of the plate (7) located on an outside of the reel flange is equal to the external diameter of the tubular crosspiece and said plate is attached to said crosspiece by welding.

9. Flange according to claim 8, characterized in that the plate located on a radially inner surface of the flange:

has a cutout larger than the external diameter of the crosspiece and is held in place by bolts (11) whose shafts pass through the two plates and the wooden pieces so as to press on said radially inner surface to clamp the central part of the flange.

* * * * *

UNITED STATES PATENT AND TRADEMARK OFFICE
CERTIFICATE OF CORRECTION

PATENT NO. : 6,478,249 B1
DATED : November 12, 2002
INVENTOR(S) : Jean Pierre Orzel It is certified that error appears in the above-identified patent and that said Letters Patent is hereby corrected as shown below:

Title page,
Item [30], Foreign Application Priority Data, should be corrected to read:
-- [30]   Foreign Application Priority Data
    Dec. 28, 1999   (FR)   ……………..99 16561 --

Column 4,
Line 22, delete "8", and replace with -- 6 --.

Signed and Sealed this

Eighteenth Day of March, 2003

JAMES E. ROGAN
*Director of the United States Patent and Trademark Office*